June 14, 1966 R. D. TOBEY 3,255,796
RETAINER MECHANISM
Filed Feb. 4, 1964 2 Sheets-Sheet 1
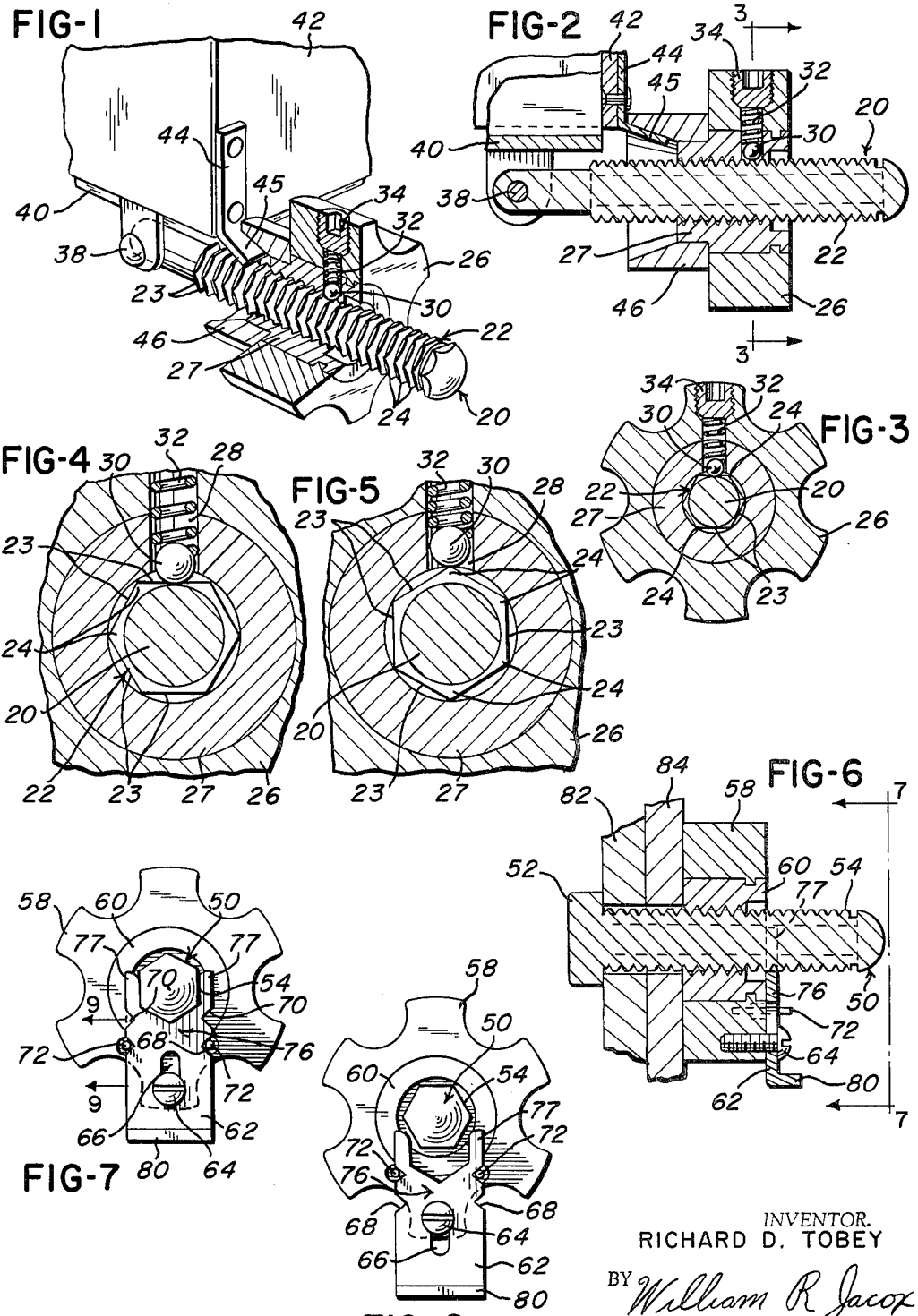
INVENTOR.
RICHARD D. TOBEY
BY William R Jacox
ATTORNEY

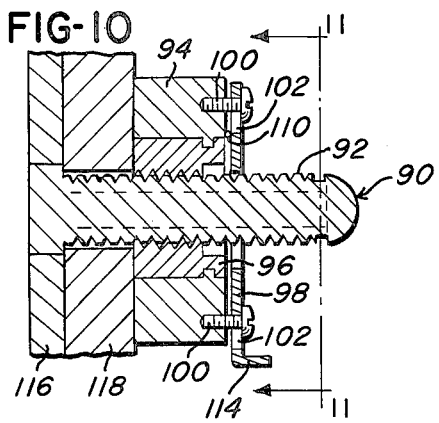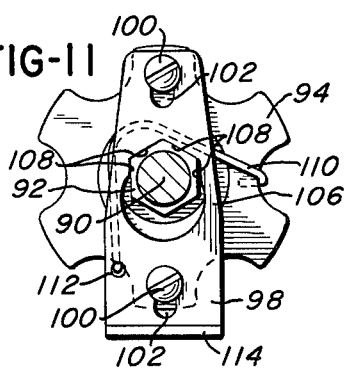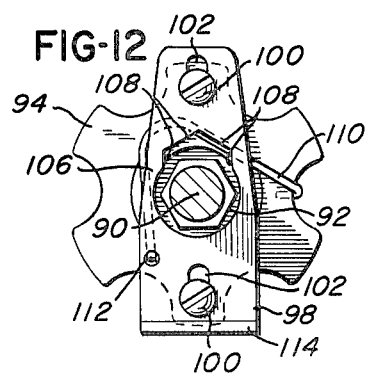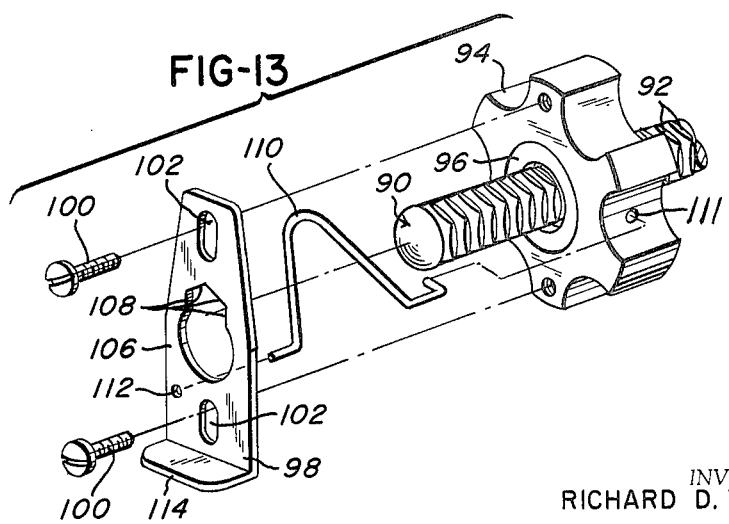

United States Patent Office 3,255,796
Patented June 14, 1966

3,255,796
RETAINER MECHANISM
Richard D. Tobey, 3663 Woodland Terrace,
Greene County, Ohio
Filed Feb. 4, 1964, Ser. No. 342,445
8 Claims. (Cl. 151—24)

This invention relates to retainer mechanism. The invention relates more particularly to retainer mechanism in which threaded members are used. The invention relates still more particularly to mechanism of the lock-type nut by which a threaded nut is attached to another threaded member, such as a bolt or stud or the like, in such a manner that vibration or the like cannot cause rotative movement of the nut with respect to the bolt or stud.

An object of this invention is to provide means by which a threaded nut is readily threadedly attached to a bolt or stud or the like but the nut is not removable from the bolt or stud by vibration or the like.

Other objects and advantages reside in the construction of parts, the combination thereof, the method of manufacture, and the mode of operation, as will become more apparent from the following description.

In the drawings:

FIGURE 1 is a perspective view, with parts shown in section, of retainer mechanism of this invention.

FIGURE 2 is a side sectional view of the mechanism of FIGURE 1.

FIGURE 3 is a sectional view taken substantially on line 3—3 of FIGURE 2.

FIGURE 4 is an enlarged fragmentary sectional view showing a portion of the elements disclosed in FIGURE 3.

FIGURE 5 is an enlarged fragmentary sectional view, similar to FIGURE 4, showing the elements of FIGURE 4 in a position of operation.

FIGURE 6 is a side sectional view of other retainer mechanism of this invention.

FIGURE 7 is a view taken substantially on line 7—7 of FIGURE 6.

FIGURE 8 is a view similar to FIGURE 7 but showing elements of the mechanism in a position of operation.

FIGURE 9 is an enlarged fragmentary sectional view taken substantially on line 9—9 of FIGURE 7.

FIGURE 10 is a side sectional view of other retainer mechanism of this invention.

FIGURE 11 is a sectional view taken substantially on line 11—11 of FIGURE 10.

FIGURE 12 is a view similar to FIGURE 11 but showing elements thereof in another position.

FIGURE 13 is an exploded perspective view of the mechanism of FIGURES 10, 11 and 12.

Referring to the drawings in detail, retainer mechanism of this invention as shown in FIGURES 1–5 comprises an elongate threaded member shown in the form of a bolt or stud 20. The stud or bolt 20 has a threaded portion 22 with a plurality of helical thread convolutions. The threaded portion 22 of the stud or bolt 20 is not circular in cross section, as is a conventional threaded stud or bolt. The threaded portion 22 of the stud or bolt 20 has a plurality of flat or straight side portions, as shown in FIGURES 3, 4 and 5. Thus, each of the helical convolutions of the threaded portion has a plurality of flat portions 23 with an apex 24 between each pair of adjacent flat portions 23, as shown in FIGURES 1, 3, 4 and 5.

A threaded nut 26 encompasses the stud or bolt 20 and is threadedly attached thereto. The nut 26 has an internal threaded portion 27 having a plurality of helical thread convolutions. The nut 26 is provided with a socket or cavity 28 which, preferably, is radially extending. A contact member, herein shown as being a ball or roller 30, is disposed within the cavity 28 and is urged into engagement with the threaded portion 22 of the stud 20 by means of a spring or resilient member 32. A plug 34 engages the spring 32 and maintains the spring 32 in compression within the socket 28. The socket 28 is so positioned with respect to the threaded portion 27 of the nut 26 that the ball 30 directly engages one of the convolutions of the thread, as shown in FIGURES 1 and 2.

The nut 26 may be threadedly rotatively moved or adjusted to any desired position along the length of the threaded portion 22 of the stud or bolt 20. As shown in FIGURES 3 and 4, when the ball 30 is positioned at the central part of a flat portion 23, the ball 30 is closest to the center or axis of the stud or bolt 20. Thus, when the ball 30 is positioned as shown in FIGURE 4 the spring 32 is in a condition of minimum compression. As the nut 26 is rotated upon the stud 20, the ball 30 follows the convolutions of the threaded portion 22. In following each thread convolution the ball 30 must move from one flat portion 23 to an adjacent flat portion 23. Each apex 24 which serves as a juncture between two adjacent flat portions 23, is farther from the center of the stud 20 than any part of a flat portion 23. Thus, as the ball 30 is moved along a thread convolution from one flat portion 23 to an adjacent flat portion 23 the ball 30 moves farther away from the center of the stud 20. The ball 30 reaches its maximum distance from the center of the stud 20 when the ball 30 is positioned at an apex 24, as shown in FIGURE 5. It is to be understood that when the ball 30 moves away from the center or axis of the stud 20, the compression of the spring 32 increases. The maximum condition of compression of the spring 32 is reached when the ball 30 engages an apex 24, as shown in FIGURE 5.

Thus, relative movement of the nut 26 with respect to the stud 20 requires a force necessary to compress the spring 32 more than its normal degree of compression. Such force is required during each movement of the ball 30 from one straight portion 23 to an adjacent straight portion 23 as the nut 26 is rotatively moved.

The total amount of force required for such movement depends upon the resilient forces of the spring 32.

Thus, it is understood that the nut 26 can be readily rotated with respect to the stud 20 if sufficient forces are applied to rotation of the nut 26 to overcome the resilient forces of the spring 32. Thus, the nut 26 is normally positioned so that the ball 30 is at the central part of the flat or straight portions 23, as shown in FIGURES 3 and 4. Therefore, the nut 26 does not rotate with respect to the stud 20 as a result of vibrational forces or the like. Thus, when the nut 26 is adjusted to a desired position with respect to the stud 20, the nut 26 firmly maintains such an adjusted position even though high vibrational forces are applied thereto. However, if it is desired to rotate the nut 26 with respect to the study 20, such rotation may be done by overcoming the forces of compression of the spring 32.

Retainer mechanism of this invention may be used in any suitable desired manner, or in conjunction with any suitable structure. Herein the stud 20 is shown as being pivotally attached by means of a pin 38 to support structure 40. A housing 42 has a bracket 44 attached thereto. The bracket 44 has a lug portion 45.

A sleeve 46 which encompasses the stud 20 is adapted to also encompass the lug portion 45 of the bracket 44, as shown in FIGURES 1 and 2. Thus, when the nut 26 is moved firmly into engagement with the sleeve 46, as shown in FIGURES 1 and 2, the sleeve 46 retains the bracket 44 against movement and thus secures the housing 42 with respect to the support structure 40. Thus, the housing 42 is firmly retained with respect to the support structure 40 and vibrational forces or the like applied to the nut 26 and stud 20 or to the other elements do not result in release of the housing 42 from the support structure 40.

FIGURES 6–9 show other retainer mechanism of this invention. A bolt or stud 50 has a head 52. The bolt or stud 50 has a polygonal threaded portion 54 similar to the threaded portion 22 of the stud 20.

A nut 58 has an internal threaded portion 60 which encompasses the stud or bolt 50 and is threadedly attached thereto. A plate 62 is carried by the nut 58. A screw 64 is attached to the nut 68, as shown in FIGURE 6, and extends through a slot 66 of the plate 62 so that the plate 62 is slidably movable with respect to the nut 58. The plate 62 has a pair of detent notches 68 and a pair of detent notches 70. The nut 58 also carries a pair of resilient detent fingers 72, each of which may be attached to the nut 58 in the manner shown in FIGURE 9.

The plate 62 has a yoke portion 76 which has two spaced-apart legs 77. The yoke 76 is adapted to be moved toward and away from the stud 50. When the stud 50 and the nut 58 are relatively rotatably positioned in the manner shown in FIGURE 7, the yoke 76 can be moved to a position partially encompassing the stud 50. In such position the legs 77 of the yoke 76 are close to a pair of opposed parallel straight surface portions of the stud 50. Thus, when the yoke 76 is so positioned as shown is FIGURE 7, the bolt or stud 50 and the nut 58 are not relatively rotatable. The yoke 76 is resiliently held in the position shown in FIGURE 7 by the resilient detent fingers 72 which are disposed within the detent notches 68 when the yoke 76 is positioned as shown in FIGURE 7.

When it is desired to relatively rotate the nut 58 and the stud 50, the plate 62 is moved in a direction from the stud 50. A flange 80 of the plate 62 is adapted for use as a pressure surface in moving the plate 62 with respect to the nut 58. Thus, the yoke 76 is moved to a position as shown in FIGURE 8 and the yoke 76 is resiliently maintained in such position by the detent fingers 72 positioned within the detent notches 70. Therefore, when the yoke 76 is positioned as illustrated in FIGURE 8 the nut 58 and the stud 50 may be relatively rotated.

FIGURE 6 shows a pair of elements 82 and 84 retained together between the head 52 of the bolt 50 and the nut 58 which is threadedly attached thereto.

FIGURES 10–13 show other retainer mechanism of this invention. A stud 90 has a threaded portion 92 which is polygonal in cross section and is similar to the studs 20 and 50. A nut 94 has an internal threaded portion 96 which encompasses the threaded portion 92 of the stud 90 and is threadedly attached thereto.

A plate 98 is attached to the nut 94 by means of screws 100 which are secured to the nut 94, as shown in FIGURE 10, and extend freely through slots 102 of the plate 98.

The plate 98 has a centrally located yoke portion 106 which has a plurality of straight sides 108, as shown in FIGURES 12 and 13.

The plate 98 is movable to a position shown in FIGURE 11 in which the straight sides 108 of the yoke 106 engage complementary straight sides of the stud 90. When the yoke 106 is so positioned as shown in FIGURE 11, the stud 90 and the nut 94 are not relatively rotatable.

Any suitable type of resilient member may be used to bias the plate 98. Herein a resilient wire type of spring 110 has one end thereof embedded within a hole 111 of the nut 94 and the other end thereof within a hole 112 of the plate 98. The portion of the spring 110 intermediate the ends thereof is substantially U-shaped and partially encompasses the stud 90 and urges the yoke 106 toward the stud 90 to position the yoke 106 as shown in FIGURE 11.

Thus, the yoke 106 is normally retained by the spring 110 in engagement with the stud 90 so that the nut 94 and the stud 90 are normally non-relatively rotatable.

Therefore, when it is desired to rotate the nut 94 with respect to the stud 90 it is necessary to move the yoke 106 in a direction away from the stud 90. A flange 114 of the plate 98 may be used as a pressure surface to push upon the plate 98 to move the plate 98 to the position thereof shown in FIGURE 12. Pressure must be maintained upon the plate 98 to maintain the yoke 106 away from the stud 90 against the forces of the spring 110. Such pressure must be maintained during rotation of the nut 94. When the yoke 106 is so positioned, as shown in FIGURE 12, the nut 94 and the stud 90 are relatively rotatable.

Thus, the nut 94 can be easily and readily threadedly rotated to a desired position with respect to the stud 90 as the plate 98 is maintained in the position thereof shown in FIGURE 12. When the plate 98 is released from such position, the spring 110 automatically moves the plate 98 and the yoke 106 to positions thereof shown in FIGURE 11. Thus, when the yoke 106 is positioned as shown in FIGURE 11, vibration or the like does not cause relative rotation between the nut 94 and the stud 90.

The stud 90 and the nut 94 are shown in FIGURE 10 as retainer means for retaining an element 116 in engagement with an element 118.

Thus, it is understood that retainer mechanism of this invention provides means by which threaded members can be readily adjusted to retain and secure elements in desired positions. The elements are retained in such positions even though high vibrational forces are applied thereto.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Retainer mechanism comprising:
   a stud, the stud having a threaded portion provided with a plurality of thread convolutions, each thread convolution having a plurality of straight portions with a juncture between adjacent straight portions, the juncture being a portion of the thread convolution which is farthest from the axis of the stud,
   a nut threadedly encompassing the threaded portion of the stud, the nut being rotatable about the axis of the stud, the nut having a radially extending socket,
   a ball disposed within the radial socket,
   a compression spring within the radial socket and urging the ball into engagement with the threaded portion of the stud, the normal position of the nut upon the stud being a position at which the ball normally engages a straight portion of a thread convolution of the threaded portion of the stud, rotation of the nut upon the stud thus resulting in moving the ball along a thread convolution from one straight portion to another straight portion, such movement of the ball from one straight portion to another straight portion resulting in increased compression of the spring as the ball moves to the juncture between adjacent straight portions, increased compression of the spring thus being required to rotatively move the nut upon the stud from the normal position of the nut upon the stud.

2. Retainer mechanism comprising:
   a member provided with a threaded portion, the threaded portion having a plurality of thread convolutions, each thread convolution having a plurality of straight portions, so that an apex is formed between adjacent straight portions, the apex being farther from the axis of the stud than any of the straight portions, a nut threadedly encompassing the threaded portion of the member, the nut being rotatable about the axis of the member so that the nut is movable along the member by rotation of the nut with respect to the member, roller means carried by the nut and in engagement with a thread convolution of the threaded portion, resilient means in engagement with the roller means and urging the roller means into engagement with the thread convolution of the threaded portion of the member, the roller means being normally in engagement with a straight portion of a convolution of the threaded portion so that when the nut is rotated with respect to the member the roller means moves from one straight portion to another straight portion of a thread convolution and in moving from one straight portion to an adjacent straight portion the roller means moves to an apex and in moving to an apex the resilient forces of the resilient means increases so that such rotative movement of the nut requires a force necessary to overcome the increased resilient forces of the resilient means.

3. Mechanism comprising:

an elongate member provided with a polygonal portion having a continuous helical thread, the helical thread having a plurality of convolutions, each convolution having a plurality of straight portions with an apex between adjacent straight portions, each apex being farther from the longitudinal center of the elongate member than any of the straight portions, a threaded nut encompassing the elongate member and threadedly attached thereto, a ball member carried by the nut and in engagement with the helical thread, resilient means engaging the ball member and urging the ball member into engagement with the helical thread.

4. Mechanism comprising:

an elongate member provided with a polygonal portion which has a continuous helical thread in which the helical thread has a plurality of straight portions, a nut encompassing the polygonal portion and threadedly attached thereto, means carried by the nut and resiliently engaging the polygonal portion and resisting rotation of the nut with respect to the polygonal portion.

5. Mechanical mechanism comprising:

an elongate polygonal member provided with a threaded portion, the threaded portion of the elongate polygonal member having a pair of opposed parallel surfaces which are spaced apart a given distance, a nut encompassing the threaded portion and threadedly attached thereto, a yoke carried by the nut and movable toward and away from the elongate polygonal member, the yoke having a pair of arms which are spaced apart a distance which is slightly greater than the given distance that said parallel surfaces of the elongate polygonal member are spaced apart so that the yoke is movable to partially encompass the threaded portion of the elongate polygonal member with the arms of the yoke parallel with said parallel surfaces of the elongate polygonal member and in juxtaposition therewith so that when the yoke is so positioned the nut and the elongate polygonal member are relatively non-rotatable.

6. Retainer mechanism comprising:

an elongate polygonal member having at least two opposed side surfaces which are parallel one with the other and spaced apart a given distance, the elongate polygonal member being threaded, a threaded nut encompassing the elongate polygonal member and threadedly attached thereto, a yoke carried by the nut and at least partially encompassing the elongate polygonal member, the yoke having a pair of opposed parallel side surfaces which are spaced apart a distance slightly greater than the given distance that the parallel side surfaces of the elongate polygonal member are spaced apart, the yoke being movable so that the opposed parallel side surfaces thereof are in juxtaposed parallel relation with said opposed side surfaces of the elongate polygonal member with the polygonal member intermediate said side surfaces of the yoke so that when the yoke is so positioned the nut is non-rotatable with respect to the elongate polygonal member.

7. Retainer mechanism comprising:

a polygonal stud provided with a threaded portion having a plurality of thread convolutions, each of the thread convolutions having a plurality of straight portions, a threaded nut encompassing the threaded portion of the stud and threadedly attached thereto, a yoke carried by the nut, the yoke being movable toward and away from the threaded portion of the stud, the yoke having a plurality of flat surfaces which are movable into parallel juxtaposed relationship with a plurality of straight portions of a convolution of the threaded portion of the stud as the yoke at least partially encompasses the threaded portion of the stud.

8. Mechanism comprising:

an elongate member provided with a polygonal portion having a continuous helical thread, the helical thread having a plurality of convolutions, each convolution having a plurality of straight portions with an apex between adjacent straight portions, each apex being farther from the longitudinal center of the elongate member than any of the straight portions, a threaded nut encompassing the elongate member and threadedly attached thereto, a contact member carried by the nut and in engagement with the helical thread, resilient means engaging the contact member and urging the contact member into engagement with the helical thread.

References Cited by the Examiner

UNITED STATES PATENTS

| | | | |
|---|---|---|---|
| 1,212,783 | 1/1917 | McGonegal | 151—11 |
| 2,024,054 | 12/1935 | Money | 151—11 |
| 3,008,344 | 11/1961 | Dracka | 74—527 |
| 3,159,074 | 12/1964 | Neuschotz | 85—47 |

MILTON KAUFMAN, *Primary Examiner.*